United States Patent
Priestley

(10) Patent No.: US 6,389,793 B1
(45) Date of Patent: May 21, 2002

(54) COMBUSTION TURBINE COOLING MEDIA SUPPLY SYSTEM AND RELATED METHOD

(75) Inventor: Robert Russell Priestley, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/552,687

(22) Filed: Apr. 19, 2000

(51) Int. Cl.$^7$ .................................................. F02C 7/00

(52) U.S. Cl. ...................... 60/39.05; 60/39.07; 60/39.75

(58) Field of Search .............................. 60/39.02, 39.05, 60/39.07, 39.59, 39.75; 415/115

(56) References Cited

U.S. PATENT DOCUMENTS

| | | | |
|---|---|---|---|
| 2,863,282 A | | 12/1958 | Torell |
| 2,940,257 A | * | 6/1960 | Eckert et al. ............... 60/39.75 |
| 3,693,347 A | | 9/1972 | Kydd et al. |
| 3,747,336 A | | 7/1973 | Dibelius et al. |
| 3,785,146 A | | 1/1974 | Bailey et al. |
| 4,259,837 A | | 4/1981 | Russell et al. |
| 4,785,622 A | | 11/1988 | Plumley et al. |
| 4,928,478 A | | 5/1990 | Maslak |
| 5,386,686 A | | 2/1995 | Chrëtien et al. |
| 5,622,044 A | | 4/1997 | Bronicki et al. |
| 5,680,752 A | | 10/1997 | Skog |
| 5,724,806 A | * | 3/1998 | Horner ....................... 60/39.07 |
| 5,778,675 A | | 7/1998 | Nakhamkin |
| 5,782,076 A | * | 7/1998 | Huber et al. ................ 60/39.02 |
| 6,038,849 A | | 3/2000 | Nakhamkin et al. |

FOREIGN PATENT DOCUMENTS

| | | |
|---|---|---|
| JP | 7-49039 | 2/1995 |
| JP | 8158890 | 6/1996 |

OTHER PUBLICATIONS

"39$^{th}$ GE Turbine State–of–the Art Technology Seminar", Tab 1, ""F" Technology–the First Half–Million Operating Hours", H.E. Miller, Aug. 1996.

"39th GE Turbine State–of–the–Art Technology Seminar", Tab 2, "GE Heavy–Duty Gas Turbine Performace Characteristics", F.J. Brooks, Aug. 1996.

"39th GE Turbine State–of–the–Art Technology Seminar", Tab 3, "9EC 50Hz 170–MW Class Gas Turbine", A.S. Arrao, Aug. 1996.

"39th GE Turbine State–of–the–Art Technology Seminar", Tab 4, "MWS6001FA–An Advanced Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines–Design and Operating Features", M.W. Horner, Aug. 1996.

(List continued on next page.)

Primary Examiner—Louis J. Casaregola
(74) Attorney, Agent, or Firm—Nixon & Vanderhye P.C.

(57) ABSTRACT

A land based gas turbine apparatus includes an integral compressor; a turbine component having a combustor to which air from the integral compressor and fuel are supplied; and a generator operatively connected to the turbine for generating electricity; wherein hot gas path component parts in the turbine component are cooled entirely or at least partially by cooling air or other cooling media supplied by an external compressor. A method is also provided which includes the steps of supplying compressed air to the combustor from the integral compressor; and supplying at least a portion of the cooling air or other cooling media to the hot gas path parts in the turbine component from an external compressor.

8 Claims, 3 Drawing Sheets

OTHER PUBLICATIONS

"39th GE Turbine State–of–the–Art Technology Seminar", Tab 7, "Advance Gas Turbine Materials and Coating", P.W. Schilke, Aug. 1996.

"39th GE Turbine State–of–the–Art Technology Seminar", Tab 8, "Dry Low $NO_x$ Combustion Systems for GE Heavy–Duty Turbines", L.B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Intergrated Control Systems for Advanced Combined Cycles", Chu et al., Aug. 1996.

"39th GE Turbine State–of–the–Art Technology Seminar", Tab 12, "Power Systems for the 21st Century"H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D.M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J.R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R.F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D.R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam path Technologies", Cofer, IV, et al., Aug. 1996.

"39th GE Turbine State–of–the–Art Technology Seminar", Tab 30, "Upgradable Opportunities for Steam Turbines", D.R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program–Conceptual Design and Product Development", Annual Report, Sep. 1, 1994–Aug. 31, 1995.

"Advanced Turbine Systems (ATS Program) Conceptual Design and Product Development", Final Technial Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Developemnt",Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Enery Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbines Manufacturing Facility, Greenville, SC", Document #1753 , Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3. "GE Breaks 60% Net Efficieny Barrier" paper, 4 pages.

"GE Businesses Share Technologies and Experts to Develop State–Of–The–Art Products", Press Information, Press Release 95–NR10, May 16, 1995, GE Technology Transfer/ pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency for GE "H" Technology Combined–Cycle Systems", Press Information, Press Release, 95–NRR16, May 16, 1995, H. Technology/pp. 1–3.

"Overview of GE's H Gas Turbine Combined Cycle", Jul. 1, 1995 to Dec. 31, 1997.

"Power Systems for the $21^{st}$ Century–"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct. 1995.

"Proceedings of the Advanced Turbine Systems Annual Program Review Meeting", vol. I , "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/ AGTSR Interactions", Sy A. Ali, pp. 103–106, Oct., 1995.

"Proceedings of the Advanced Turbine Systems Annual Program Review Meeting", vol. I "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, "Lean Premixed Flames for Low No$_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct. , 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M.K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995

"Proceedings of the Advanced Turbine Systems Annual Program Review Meeting", vol.II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol.II, "Premixed Burner Experiements: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol.II, "Active Control of Combustion Instabilities in Low NO$_x$ Gas Turbines", Zinn et al., pp. 550–551, Oct., 1995.

"Proceedings of the Advanced Turbine Systems Annual Program Review Meeting", vol.II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", gerald McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "The AGTSR Industry University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov. 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application,"Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Developement of an Advanced 3d & Viscous Aerodynamics Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Minking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling For Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting","Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine–High Efficiency, Low Cost of Electricity and Low Emissions", Roger Schonewald and Patrick Marolda, (no date available).

"Testing Program Results Validate GE's H Gas Turbine–High Efficiency, Low Cost of Electricity and Low Emissions", Slide Presentation –working draft, (no date available).

"The Next Step in H...For Low Cost Per kW–Hour Power Generation", LP–1 PGE '98.

"Utility Advanced Turbine System (ATS) Technology Readiness Testing and Pre–Commercial Demonstration"Document #4860040, Oct. 1–Dec. 31, 1996, Publication Date, Jun. 1, 1997, Report Nos: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos: DOE/MC/31176–10.

"Utility Advanced Turbine Systems (ATS) Technology Readiness Testing and Pre–Commerical Demonstration, Phase 3", Document #486029, Oct. 1–Dec. 31, 1995, Publication date, May 1, 1997, Report Numbers: DOE/MC/31176–5340.

"Utility Advanced Turbine System (ATS) Technology Readiness Testing and Pre–Commercial Demonstration–Phase 3", Document #486132, Apr. 1–Jun. 30, 1976, Publication Date, Dec. 31, 1996, Report Nos: DOE/MC/31176–5660.

"Utility Advanced Turbine System (ATS) Technology Readiness Testing and Pre–Commercialization Demonstration—Phase 3", Document #587906, Jul. 1–Sep. 30, 1995, Publication Date, Dec. 31, 1995, Report Numbers: DOE/MC/31176–5339.

"Utility Advanced Turbine System (ATS) Technology Readiness Testing and Pre–Commercialization Demonstration"Document #666277, Apr. 1–Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration"Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1–Mar. 31, 1998,Publication Date, Aug. 1, 1998, Report Nos: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998,Publication Date: May, 1, 1999, Report Nos: DE–FC21–95MC31176–20.

"Utility Advanced Turbine Systems (ATS) Technology Readiness Testing", Document #1348, Apr. 1–Jun. 29, 1998, Publication Date oct. 29, 1998, report Nos. DE–FC21–95MC31176—18.

"Utility Advanced Turbine Systems (ATS) Technology Readiness Testing and Pre–Commercial Demonstration", Quarterly Report, Jan. 1–Mar. 31, 1997, Document #666275, Report Nos: DOE/MC/31176–07.

"Proceedings of the 1997 Advanced Turbine Systems", Annual Program Meeting, Oct. 28–29, 1997.

* cited by examiner

US 6,389,793 B1

COMBUSTION TURBINE COOLING MEDIA SUPPLY SYSTEM AND RELATED METHOD

This invention relates to supplying augmenting compressed air and/or cooling media to a combustion turbine via a separate compressor. For the case of cooling media supply, the media may be conditioned, e.g., cooled and/or humidified.

BACKGROUND OF THE INVENTION

Most combustion turbines use air bled from one or more locations of the integral compressor to provide for cooling and sealing in the turbine component. Air bled from the compressor for this purpose may be routed internally through the bore of the compressor-turbine rotor or other suitable internal passages to the locations that require cooling and sealing in the turbine section. Alternatively, air may be routed externally through the compressor casing and through external (to the casing) piping to the locations that require cooling and sealing. Many combustion turbines utilize a combination of the internal and external routing of cooling and sealing air to the turbine component. Some combustion turbines use heat exchangers to cool the cooling and sealing air routed through the external piping before introduction into the turbine component.

The output or capacity of a combustion turbine usually falls off with increasing temperature at the inlet to the compressor component. Specifically, the capacity of the compressor component to supply air to the combustion process and subsequent expansion through the turbine is reduced as the compressor inlet temperature is increased (usually due to increased ambient temperature). Thus, the turbine component and combustion component of the combustion turbine usually have the capability to accept more compressed air than the compressor component can supply when operating above a certain inlet temperature.

SUMMARY OF THE INVENTION

In accordance with one embodiment of this invention, the supply of pressurized air to the combustion and turbine components is augmented by use of an external compressor when the capability of the integral compressor is reduced, thereby increasing the output of the combustion turbine or combined cycle power plant.

There are, however, several ways to utilize the external compressor. One way is to insert compressed ambient air into the combustion turbine flow path at the exit of the compressor component and/or in the combustion component before fuel addition. (This will be referred to as "pure augmentation" air supply).

Another way of using the external compressor is to incorporate it into a system for supplying conditioned cooling and sealing media to the turbine component. This may be done combined with the pure augmentation method described above, or separately in the event the pure augmentation method is not utilized. The supply of cooling media by the external supply system reduces that which would normally be supplied through extraction from the integral compressor component of the combustion turbine, allowing more air from the integral compressor to be directed to the combustion component, thereby increasing output.

In its broader aspects, therefore, the invention relates to a land based gas turbine apparatus comprising an integral compressor; a turbine component having a combustor to which air from the integral compressor and fuel are supplied; and a generator operatively connected to the turbine for generating electricity; wherein hot component parts in the turbine component are cooled at least partially by air or other cooling media supplied by an external compressor.

In another aspect, the invention relates to a method of insuring peak power capability for a gas turbine power plant including an integral compressor, a turbine component including a combustor and a generator, wherein hot gas path parts in the turbine component are cooled by cooling air, the method comprising supplying compressed air to said combustor from the internal compressor; and supplying at least a portion of the cooling air or other cooling media to the hot gas path parts in the turbine component from an external compressor.

DESCRIPTION OF THE INVENTION

Figure 1:
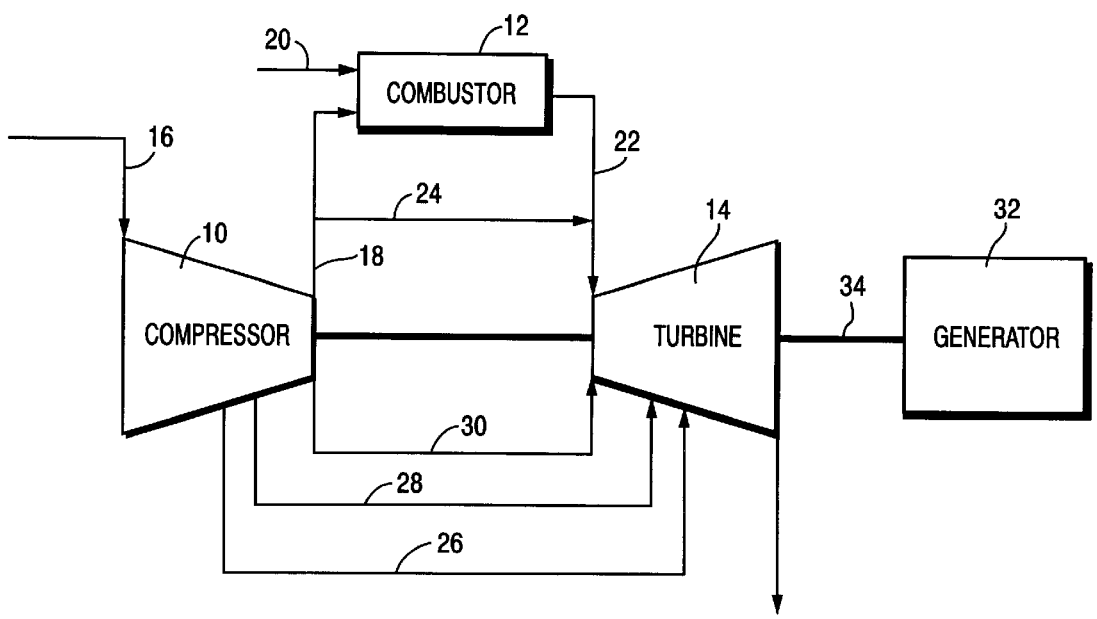
FIG. 1 is a schematic diagram of a known cooling arrangement for a combustion turbine.

FIG. 1 represents a conventional cooled combustion turbine system including an integral compressor 10, combustor 12 and turbine component 14. Inlet air is supplied to the compressor via stream 16. Compressor air is extracted from various locations in the compressor and supplied to the locations in the turbine component 14 that require cooling and sealing. Remaining compressor air is supplied to the combustor. The extraction locations are chosen to supply air at the required pressures. This remaining air is compressed air is supplied at high pressure to the combustor via stream 18 where it mixes with fuel supplied by stream 20. The hot combustion gas is supplied to the turbine component 14 via stream 22. Some compressor air may be diverted to bypass the combustor via stream 24, entering the hot combustion gases before entering the turbine. The flow streams 26, 28 and 30 represent cooling air extractions from the integral compressor that are routed to the, turbine section of the machine for cooling and sealing hot gas path component parts. Streams 26 and 28 that supply the low and intermediate pressure coolant, respectively, may be routed via piping external to the compressor casing, and reintroduced through the turbine casing into the parts that need cooling. Stream 30 supplies the high pressure coolant and is typically routed internally of the machine, for example, through the bore of the compressor-turbine rotor. The compressor 10, turbine section 14 and generator 32 are shown in a single shaft configuration with the single shaft 34 also driving the generator 32.

Figure 2:
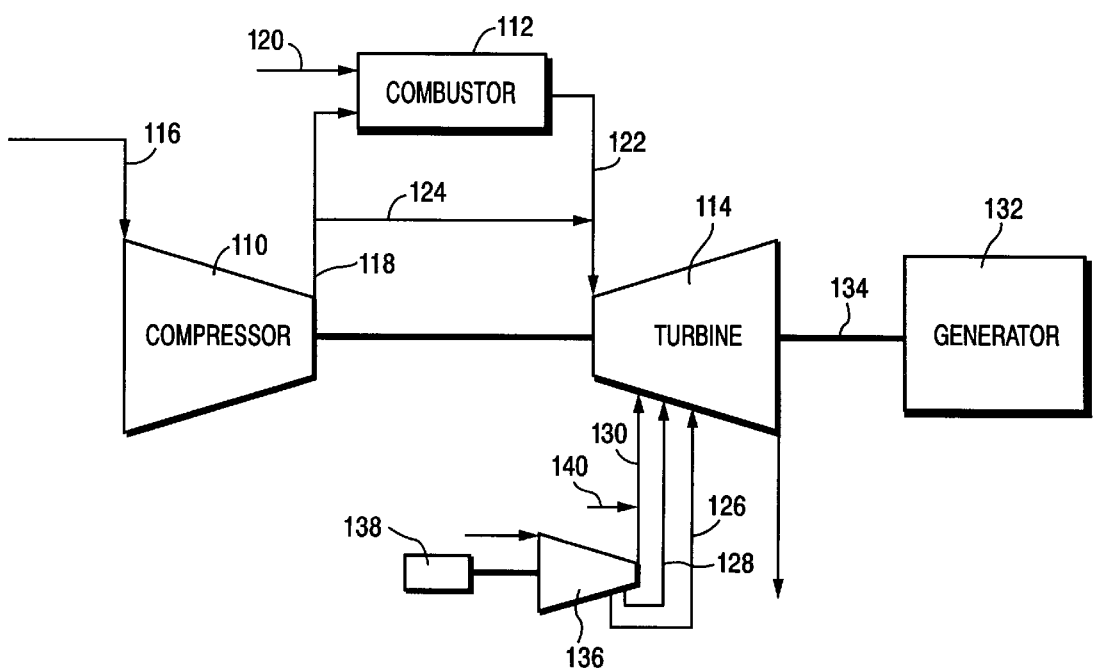
FIG. 2 is a schematic diagram of a cooling arrangement for a combustion turbine in accordance with an exemplary embodiment of this invention.

FIG. 2 illustrates an example of the present invention and where, for the sake of convenience and ease of understanding, reference numerals similar to those used in FIG. 1 are applied to corresponding components, but with the prefix "1" added. As in the conventional system described above, inlet air is supplied to the compressor 110 via stream 116. Compressed air is supplied to the combustor 112 via stream 118 where it mixes with fuel supplied to the combustor via stream 120. Bypass air may be supplied to the hot combustion gases via stream 124. Here, however, the respective low, intermediate and high pressure cooling air streams 126, 128 and 130 (or other cooling media) are generated by a separate external compressor 136 driven by a motor 138. In this embodiment, all of the air or other cooling media is supplied by the external compressor 136, thus allowing more of the combustion turbine compressor air to be used in the combustion process. Because the compressor 136 can be dedicated for supplying only cooling air or other cooling media, the cooling requirements of the turbine component can be met regardless of compressor capability variations due to increased ambient temperatures. In other words, because the integral compressor 110 is freed from cooling duty requirements, sufficient air is available to satisfy the capability of the combustor and turbine component, thereby increasing output.

Figure 3:
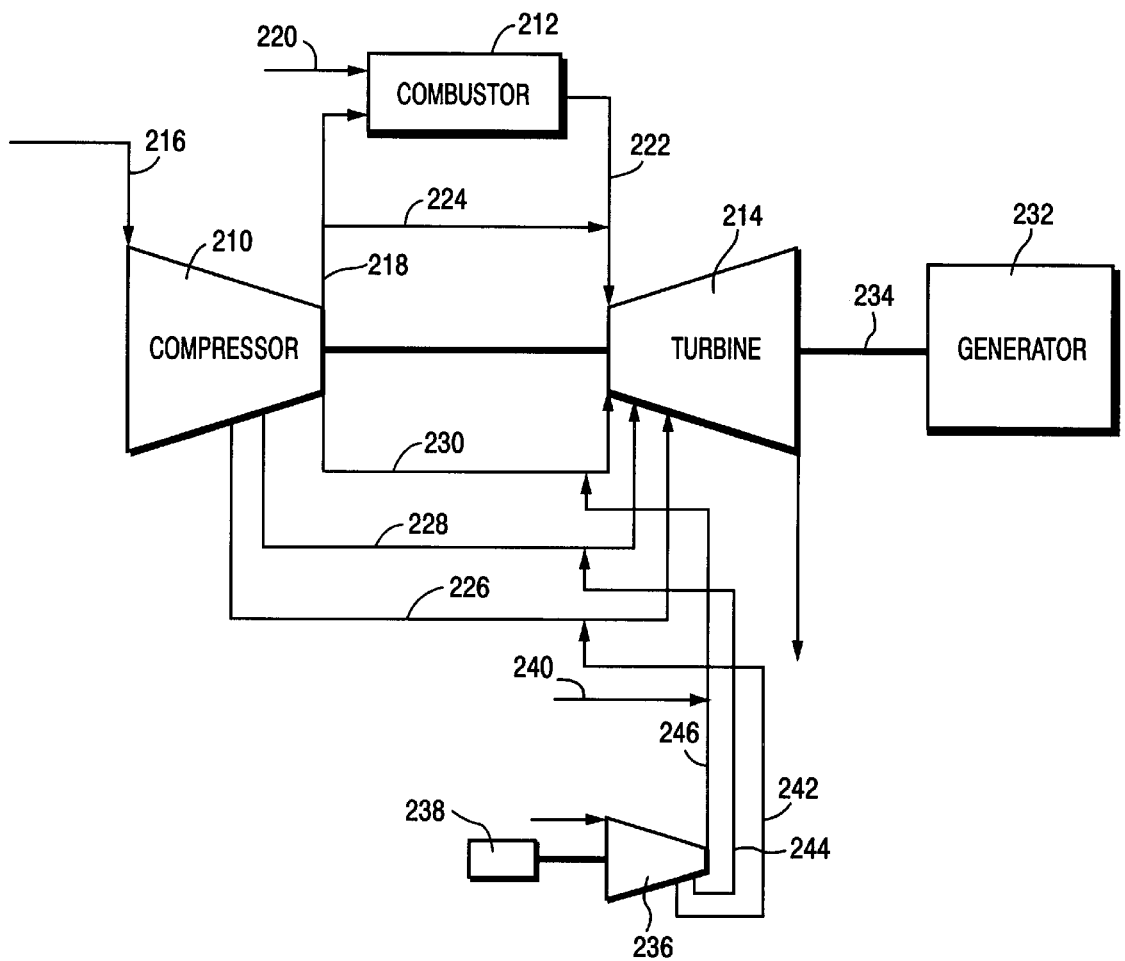
FIG. 3 is a schematic diagram of a cooling arrangement for a combustion turbine in accordance with another exemplary embodiment of the invention.

FIG. 3 illustrates a variation where cooling air is supplied by both the integral turbine compressor 210 and by the external compressor 236 (this could be an intercooled compressor) in a pure augmentation technique. In other words, the external compressor 236 is utilized to augment the supply of compressed air from the integral compressor 210 to the turbine component for cooling and sealing purposes. Here, the low, intermediate and high pressure cooling air is supplied by integral compressor 210 via respective streams 226, 228 and 230, but supplemented as necessary by cooling air supplied by external compressor 236 via respective low, intermediate and high pressure streams 242, 244 and 246. Because the cooling duty requirements are augmented by the external compressor 236, the supply of compressed air to the combustor 212 from the compressor 210 is increased resulting in increased output.

Figure 4:
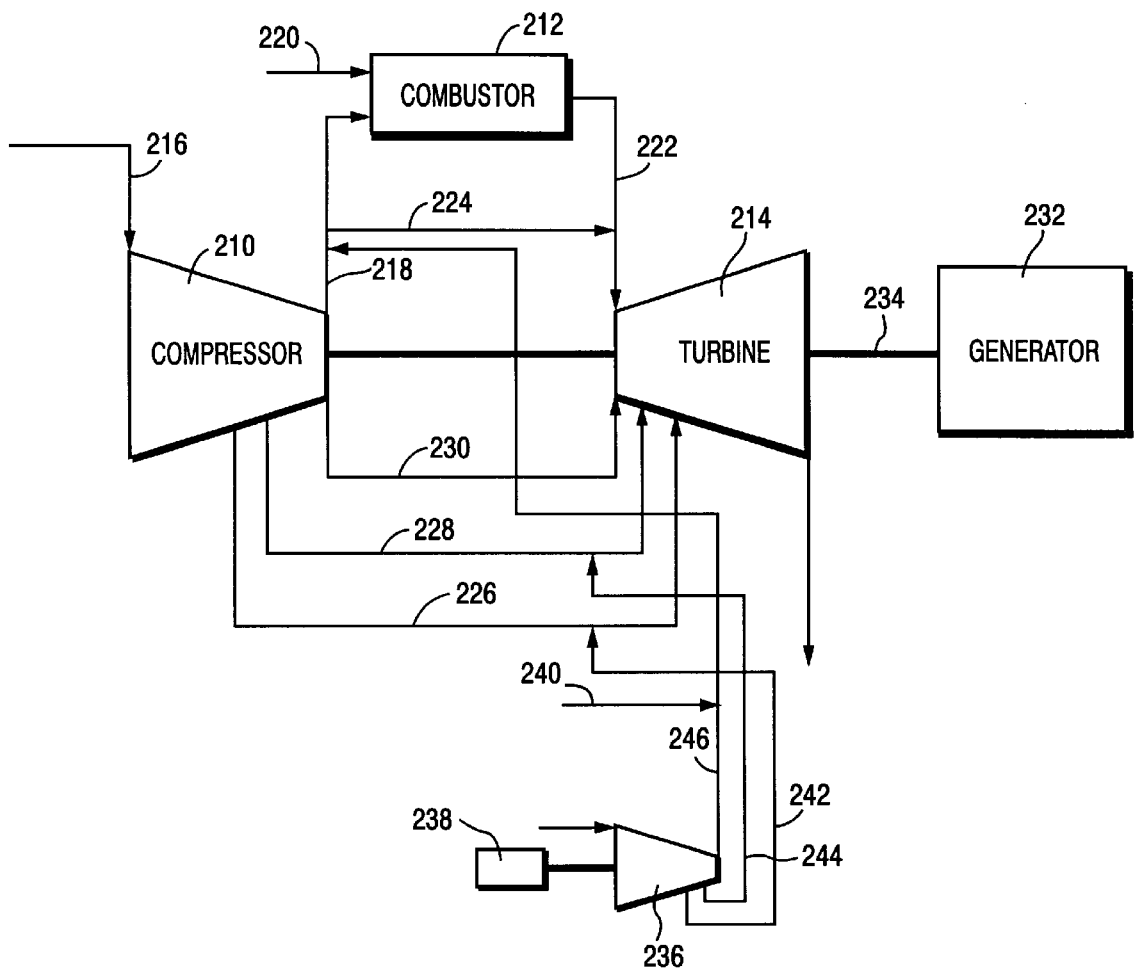
FIG. 4 is a schematic diagram of a cooling arrangement for a combustion turbine in accordance with still another embodiment of the invention.

Optionally, as shown in FIG. 4, compressed air from stream 246 can be supplied to the combustor via line 218 (rather than to the turbine section via stream 230) to augment the supply of air from the integral compressor 210. Otherwise, the arrangement in FIG. 4 is identical to the arrangement in FIG. 3. Moreover, the augmented supply of cooling media to the turbine section 214 via streams 242 and 244 can be shut off, so that the external compressor augments the air supply only to the combustor.

Additional features can be added to the separate air cooling media supply system, such as humidification of the cooling media. One suitable means of humidification employs a saturator and hot water heated by waste or primary energy. Moisture introduction is shown in FIGS. 2 and 3 via streams 140, and 240, respectively. Waste heat is readily available from the turbine exhaust in single cycle systems for evaporation of water that can then be introduced into any of the discharge air streams of compressor 136 or 236, as appropriate. The coolant supply system can modulate the flow, pressure, temperature and composition of the supplied cooling media.

The above described invention thus provides peak power capability for a gas turbine, particularly when ambient temperature rises to a level that causes reduced flow to the integral turbine compressor, resulting in reduced output. In other words, as ambient temperature rises and air flow into the turbine compressor decreases, the external compressor 136 or 236 may be employed to maintain or increase output by supplying all, or additional cooling air (or other cooling media) in an amount necessary to optimize the flow of cooling air to the hot gas path parts of the turbine sections and/or to augment the flow of air or other cooling media to the combustion process. Further in this regard, by using an external compressor, greater cooling air flow can be provided than that available from the integral turbine compressor since only a small percentage of air from the turbine compressor is available for cooling duty. In other words, in conventional systems the amount of cooling air is limited by the capacity of the integral compressor. By supplying cooling air from an external compressor where all of the air or other cooling media may be used for cooling duty, the turbine compressor can supply more air to the combustion process, thereby increasing turbine output. This is true whether the external compressor 136, 236 is used alone or in conjunction with the integral turbine compressor 110, 210.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A land based combustion gas turbine apparatus comprising:
   an integral compressor;
   a turbine component;
   a combustor to which air from the integral compressor and fuel are supplied, said combustor arranged to supply hot combustion gases to the turbine component;
   a generator operatively connected to the turbine for generating electricity; and
   an external compressor arranged and connected to supply cooling air or other cooling media, without intercooling, to hot gas path component parts in said turbine component.

2. The apparatus of claim 1 including means for humidifying said cooling air or other cooling media.

3. The apparatus of claim 1 wherein all of said cooling air or other cooling media is supplied by said external compressor.

4. A method of insuring peak power capability for a land based gas turbine power plant including an integral compressor, a turbine component, a combustor and a generator, wherein hot gas path parts in the turbine component are cooled by cooling air, the method comprising:
   a) supplying compressed air to said combustor from said integral compressor; and
   b) supplying cooling air or other cooling media to said hot gas path parts in the turbine component from an external compressor, without intercooling.

5. The method of claim 4 including humidifying said cooling air or other cooling media supplied by said external compressor.

6. The method of claim 4 wherein step (b) is commenced as a function of ambient temperature.

7. The method of claim 4 wherein step (b) is commenced as a function of air flow rate through the integral compressor.

8. The method of claim 4 wherein all of the cooling air or other cooling media to said hot gas path parts is supplied by the external compressor.

* * * * *